United States Patent Office 3,291,824
Patented Dec. 13, 1966

3,291,824
N-(2-HALO-LOWER ALKANOYL)ANTHRANILIC ACID DERIVATIVES
Milan Radoje Uskokovic, Passaic, and Wilhelm Wenner, Upper Montclair, N.J., assignors to Hoffmann-La Roche Inc., Nutley, N.J., a corporation of New Jersey
No Drawing. Filed Apr. 5, 1963, Ser. No. 270,788
2 Claims. (Cl. 260—518)

This application is a continuation-in-part of application Serial No. 185,512, filed April 6, 1962, now abandoned, in the names of Milan Radoje Uskokovic and Wilhelm Wenner.

The present invention relates to novel organic compounds and methods of preparing same. The organic compounds to which the present invention relates are novel quinazolinones, novel benzoxazepinediones, and novel anthranilic acid derivatives. The process aspects of the invention involve preparation of 4,1-benzoxazepine-2,5-(1H,3H)-diones from haloacylated anthranilic acids, and conversion of the benzoxazepinediones so obtained to 2-($\alpha$-hydroxy-lower alkyl)-dihydro-quinazolinones. More particularly, the novel quinazolinones of the present invention are 2-($\alpha$-hydroxy-lower alkyl)-quinazolinones of the formulae:

(I) 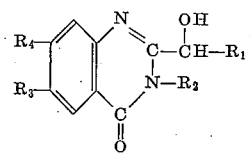

(II) 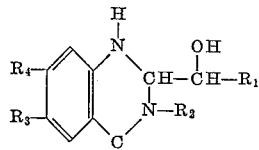

(Ia) 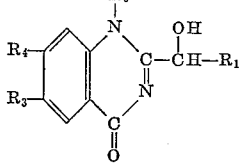

(IIa) 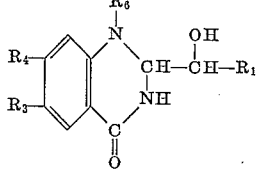

wherein $R_1$ is selected from the group consisting of hydrogen and lower alkyl; $R_2$ is selected from the group consisting of hydrogen, lower alkyl and amino; $R_3$ is selected from the group consisting of hydrogen, halogen and sulfamyl; $R_4$ is selected from the group consisting of hydrogen and halogen and $R_6$ is selected from the group consisting of lower alkyl, phenyl and lower alkyl phenyl, which in turn can be prepared from 4,1-benzoxazepine-2,5-(1H,3H)-diones of the formula (III) 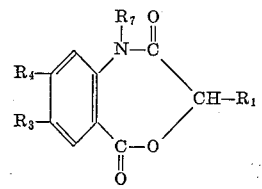

wherein $R_1$, $R_3$ and $R_4$ have the same meanings as above and $R_7$ is selected from the group consisting of hydrogen, lower alkyl, phenyl, and lower alkyl phenyl. Compounds of Formulae I, Ia, II, IIa and III are pharmaceutically useful compounds.

Also included within the scope of the present invention are pharmaceutically acceptable salts of the compounds of the above formulae designated I, Ia, II, IIa, and III. For example, compounds of Formula I are acidic in nature and form salts with pharmaceutically acceptable bases. Thus, for example, they form non-toxic metallic salts such as sodium, potassium, calcium and aluminum salts and the like. Moreover, compounds of Formulae II and IIa are basic in nature and, thus, form salts with pharmaceutically acceptable acids. Representative of such acids are hydrochloric acid, citric acid, ethane sulfonic acid, maleic acid and the like. Such salts are included within the scope of the present invention.

Compounds of Formulae II and IIa above can be prepared, respectively, by reduction of compounds of Formulae I and Ia above. Such reduction can be effected by treating compounds of Formulae I and Ia above by conventional procedures, e.g. with a suitable reducing agent such as sodium borohydride, hydrogenation employing platinum and the like.

The treatment is conducted in the presence of suitable inert organic solvents such tetrahydrofuran, ethylene glycol dimethyl ether or the like. Preferably, a catalyst such as $AlCl_3$ is present during the reduction step if a reducting agent, e.g. sodium borohydride is employed for such a purpose.

The compounds of Formulae I and Ia are prepared from compounds of Formula III by reacting the latter compounds with a compound of the formula $H_2NR_2$ wherein $R_2$ has the meaning ascribed thereto hereinabove. Such a reaction is preferably effected in the presence of a lower alkanol. In one aspect, when compounds corresponding to Formula III above wherein $R_7$ is hydrogen are reacted with a compound of the formula $H_2NR_2$, compounds corresponding to Formula I are obtained. In another aspect, when compounds corresponding to Formula III above wherein $R_7$ is lower alkyl or phenyl are reacted with ammonia, compounds corresponding to Formula Ia above are obtained.

The conversion of compounds corresponding to Formula III to compounds corresponding to Formula I or Formula Ia above proceeds through two steps. The first step being the opening of the seven-membered ring into an intermediate of the formula (IV) 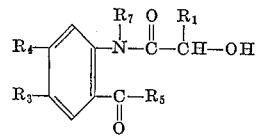

wherein $R_1$, $R_3$, $R_4$ and $R_7$ have the same meaning as above and $R_5$ is selected from the group consisting of lower alkylamino, amino, lower alkoxy and hydrazino, which compound in the second step of the conversion undergoes ring closure to the six-membered ring system of Formula I or Ia above. The conversion of a compound of Formula III to a compound of Formula I or Formula Ia can, of course, be conducted either with or without isolation of the intermediate compound of Formula IV above. Thus, a compound of Formula III above can be treated with ammonia, a lower alkylamine or hydrazine and the reaction interrupted when a compound of Formula IV is obtained, and said compound of Formula IV can then be further reacted with ammonia, a lower alkylamine or hydrazine to obtain a compound of Formula I or Formula Ia wherein $R_2$ is hydrogen, lower alkyl or amino, respectively. On the other hand, a compound of Formula III can be treated with ammonia, a lower alkylamine or hydrazine until a compound of Formula I or Formula Ia is obtained without interrupting the reaction or isolating an intermediate of Formula IV above. These variations are illustrated in the examples below.

The treatment with ammonia, a lower alkylamine or hydrazine can be conducted at room temperature or at above or below room temperature. When conducted above room temperature, the temperature should be such, of course, that no substantial proportion of the ammonia, lower alkylamine or hydrazine being used escapes. The treatment with ammonia, lower alkylamine or hydrazine is advantageously conducted in a lower alkanol such as methanol, ethanol, propanol or the like which, per se, can serve as the solvent or some other conventional organic solvent as a ketone such as acetone, a hydrocarbon such as benzene, or the like, can be used as the solvent medium.

In a preferred aspect, the reaction of compounds of Formula III above with ammonia, lower alkylamine or hydrazine proceeds in the presence of a lower alkanol. The alkanol, as is pointed out above, is best provided by employing it as the solvent medium. Alternatively, as is also pointed out above, the alkanol, the compound of the formula $H_2NR_2$ and the compound of Formula III above can be added sequentially or simultaneously to any conventional organic solvent such as the types specified hereinabove, and the process according to the present invention conducted therein. For example, the alkanol and the compound corresponding to Formula III above can be added to any conventional organic solvent. Thereafter, the reaction with the ammonia, lower alkylamine or hydrazine can be conducted with such conventional organic solvents serving as the reaction medium. Accordingly, in this aspect, the ring opening is effected by alcoholysis. The process can be stopped at this stage whereby compounds of Formula IV above wherein $R_5$ is lower alkyl are obtained.

The compounds of Formula III above can be prepared from anthranilic acid and derivatives thereof. In this preparation, the first step comprises the haloacylating of the said anthranilic acid starting material to yield a compound of the formula

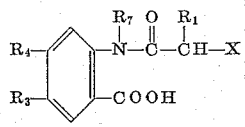

wherein X is halogen, $R_1$, $R_3$, $R_4$ and $R_7$ have the same meaning as above. The haloacylation can be effected by treating the anthranilic acid or a derivative thereof, e.g. N-lower alkyl or N-phenyl anthranilic acid, with an α-halo lower alkanoyl halide such as chloroacetyl chloride, 2-bromopropionylbromide, or the like, in the presence of pyridine, dimethylformamide or the like. The treatment can be effected in any inert organic solvent such as ether or the like, or the dimethylformamide, pyridine or the like can serve as the solvent medium. Compounds of Formula V are novel and thus constitute a part of the present invention.

The compounds of Formula V above can be converted to the desired compounds of Formula III above by treatment with two or more equivalents of dimethylformamide. This treatment can be effected in conventional inert organic solvents such as ether, dioxane or the like, or the dimethylformamide itself can serve as the solvent. The treatment is suitably effected at elevated temperatures since it has been found that the reaction is temperature dependent and is accelerated by increased temperatures. Preferably, the reaction should be conducted at above about 70° C. It is especially advantageous to conduct the reaction between about 100° C. and the boiling point of the solvent medium (for example, 155° C., the boiling point of dimethylformamide).

The compounds of Formula I above can be denoted as 3,4 - dihydro - 2 - (α-hydroxy-lower alkyl)-4-quinazolinones. The compounds of Formula II above are the 1,2-dihydro derivatives of compounds of Formula I above and thus can be denoted as 2-(α-hydroxy-lower alkyl)-1,2,3,4-tetrahydro-4-quinazolinones. The compounds of Formula Ia above can be denoted as 1,4-dihydro-2-(α-hydroxy-lower alkyl) - 4 - quinazolinones. The compounds of Formula IIa above are the 2,3-dihydro derivatives of the compounds of Formula Ia above and can, as compounds of Formula Ia above, be denoted as 2-(α-hydroxy-lower alkyl)-1,2,3,4-tetrahydroquinazolinones.

As stated above, the compounds of Formulae I, Ia, II and IIa are pharmaceutically useful compounds. More particularly, those wherein $R_3$ is sulfamyl and $R_4$ is halogen are useful as diuretics. Of these, especially preferred are those compounds of Formula I wherein $R_1$ and $R_2$ are lower alkyl, particularly, methyl, and those of Formula II wherein $R_1$ is hydrogen. Compounds of Formulae I, Ia, II and IIa wherein $R_3$ is hydrogen or halogen are useful as bronchodilators. Moreover, compounds of Formulae I, Ia, II and IIa are useful as hypotensives. Especially useful are compounds of Formula Ia wherein $R_6$ is phenyl, $R_3$ and $R_4$ are hydrogen and $R_1$ is lower alkyl, preferably methyl, and compounds of Formula I wherein $R_2$, $R_3$ and $R_4$ are all hydrogen and $R_1$ is lower alkyl, preferably methyl, since these compounds have choleretic properties.

Compounds of Formulae I and Ia are additionally useful since they are intermediates in the preparation of compounds of Formulae II and IIa.

Compounds of Formula III above can be referred to as 4,1-benzoxazepine-2,5(1H,3H)-diones. These compounds, as stated above, are pharmaceutically useful substances. For example, those wherein $R_3$ is sulfamyl and $R_4$ is halogen are useful as diuretics. Moreover, compounds of Formula III above wherein $R_7$ is phenyl or lower alkyl are useful as choleretics. Especially preferred for such last-mentioned purpose are compounds corresponding to Formula III above wherein $R_4$ is hydrogen and $R_7$ is lower alkyl, more preferably methyl, particularly those wherein $R_3$ is halogen, more particularly chlorine. Of significant interest, insofar as choleretics are concerned, is a compound corresponding to Formula III above wherein $R_4$ is hydrogen, $R_3$ is chlorine, $R_1$ is either hydrogen or lower alkyl and $R_7$ is methyl. Moreover, the compounds of Formula III above are useful intermediates in the preparation of compounds of Formulae I, Ia, II and IIa above.

The compounds of Formulae I, Ia, II, IIa and III above and their nontoxic salts can be administered internally, for example, parentally or enterally with dosage adjusted to individual requirements. They can be combined in conventional pharmaceutical dosage forms, for example both solid and liquid forms such as suspensions, solutions, tablets, capsules or the like.

The expression "lower alkyl" is intended to designate straight and branched chain lower alkyl moieties such as methyl. The expression "lower alkyl phenyl" as used throughout the disclosure, is intended to connote a phenyl ring having lower alkyl moieties substituted thereon, e.g.

The term "hydroxy-lower alkyl" refers to groups such as hydroxymethyl and α-hydroxyethyl. The term "α-halo-lower alkanoyl" refers to acyl groups bearing a halogen substituent on the α-carbon atom, i.e., groups such as chloroacetyl, bromoacetyl, α-bromopropionyl and the like.

The following examples are illustrative but not limitative of the invention. All temperatures are stated in degree centigrade.

Example 1

To a solution of 20 parts of 4-chloro-5-sulfamylanthranilic acid in 150 parts dimethylformamide at 0°, there was added 11.2 parts of chloroacetyl chloride, and the reaction mixture was then stirred for 2 hours at room temperature, after which a large excess of cold water was added, the resulting precipitate filtered off, washed with water and dried. Recrystallization of the residue from acetone-water gave 4-chloro-N-chloroacetyl-5-sulfamylanthranilic acid melting at 263–265°.

Example 2

A solution of 12 parts of 4-chloro-N-chloroacetyl-5-sulfamylanthranilic acid in 300 parts of dimethylformamide was refluxed for 1½ hours and then evaporated to dryness. Recrystallization of the residue from methanol gave 8-chloro-7-sulfamyl-4,1-benzoxazepine-2,5(1H,3H)-dione melting at above 310°.

Example 3

To a cooled solution of 20 parts of 4-chloro-5-sulfamylanthranilic acid in 150 parts of dimethylformamide, 21.5 parts of 2-bromopropionyl bromide was added and the reaction mixture stirred for 2 hours at room temperature. A large excess of water was then added, and the crystalline precipitate filtered off and dried. Recrystallization from ethyl acetate-hexane gave N-(2-bromopropionyl)-4-chloro-5-sulfamylanthranilic acid melting at 240–242°.

Example 4

A solution of 7 parts of N-(2-bromopropionyl)-4-chloro-5-sulfamylanthranilic acid in 300 parts of dimethylformamide was refluxed for 1 hour, and then evaporated to dryness. The residue was crystallized from methanol, giving dl-8-chloro-3-methyl-7-sulfamyl-4,1-benzoxazepine-2,5(1H,3H)-dione melting at above 330°.

Example 5

A suspension of 10 g. of 8-chloro-7-sulfamyl-4,1-benzoxazepine-2,5(1H,3H)-dione in 1000 ml. of methanol was heated on a steam bath until solution was obtained, and then saturated with ammonia. After standing overnight, the reaction mixture was evaporated to a small volume, and the crystalline precipitate filtered off. After recrystallization from methanol, it gave 7-chloro - 3,4 - dihydro - 2 - hydroxymethyl - 4 - oxo - 6-quinazoline sulfonamide, melting at 260° (with decomposition).

Example 6

To a solution of 8.7 g. of 7-chloro-3,4-dihydro-2-hydroxymethyl-4-oxo-6-quinazoline sulfonamide in 400 ml. of absolute tetrahydrofuran, 1.1 g. of sodium borohydride was added in small portions. This was then followed by addition of 4 g. of aluminum chloride dissolved in 120 ml. of absolute tetrahydrofuran. When the evolution of hydrogen had terminated, the mixture was refluxed for 2 hours and allowed to stand overnight. After slow addition of 120 ml. of water and enough 1 N hydrochloric acid to make the solution acidic, tetrahydrofuran was distilled off. The precipitated solid was then filtered off, washed with water and dried, yielding dl-7-chloro-2-hydroxymethyl - 4 - oxo - 1,2,3,4-tetrahydro-6-quinazoline sulfonamide melting at 240–245° (with decomposition).

Examplet 7

A suspension of 10 g. of 8-chloro-7-sulfamyl-4,1-benzoxazepine-2,5(1H,3H)-dione in 1000 ml. methanol was heated on a steam bath until solution, and then saturated with methylamine. After standing overnight, the reaction mixture was evaporated to a small volume and the crystalline precipitate filtered off. Recrystallization from methanol yielded 7-chloro-3,4-dihydro-2-hydroxymethyl-3-methyl-4-oxo-6-quinazoline sulfonamide melting at 218–220°.

Example 8

2.3 g. of 7-chloro-3,4-dihydro-2-hydroxymethyl-3-methyl-4-oxo-6-quinazoline sulfonamide was added to a solution of 1.03 g. of aluminum chloride in 350 ml. of absolute ethylene glycol-dimethyl ether, followed by addition of 1.4 g. of sodium borohydride. The reaction mixture was stirred at room temperature for one hour, and then for one hour at 85°. After cooling, 40 ml. of water was slowly added, and then dilute hydrochloric acid until a clear acid solution resulted. This solution was evaporated to dryness and the residue dissolved in water. After a short time, a precipitate formed, which was collected, washed with water and dried. Recrystallization from acetone-hexane gave dl-7-chloro-2-hydroxymethyl - 3 - methyl - 4 - oxo - 1,2,3,4 - tetrahydro-6-quinazoline sulfonamide, M.P. 235–237.5°.

Example 9

A suspension of 7.5 g. of dl-8-chloro-3-methyl-7-sulfamyl-4,1-benzoxazepine-2,5(1H,3H)-dione in 500 ml. of methanol was heated on a steam bath until solution, and then saturated with methylamine. After standing overnight, the solution was concentrated in vacuo and the crystalline precipitate collected and recrystallized from acetone yielding 7-chloro-3,4-dihydro-2-(1-hydroxyethyl)-3-methyl-4-oxo-6-quinazoline sulfonamide melting at 230–232°.

The above described compound, i.e. 7chloro-6-sulfamyl-3,4 - dihydro - 2 - (1 - hydroxyethyl) - 3 - methyl - 4-quinazolinone, is useful as a diuretic and is also useful as a hypotensive.

Example 10

2.4 g. of 7 - chloro - 3,4 - dihydro - 2 - (1 - hydroxyethyl) - 3 - methyl-4-oxo-6-quinazoline sulfonamide was added to a cooled solution of 1.03 g. of aluminum chloride in 250 ml. absolute ethylene glycol-dimethyl ether, followed by addition of 1.4 g. of sodium borohydride. The reaction mixture was stirred for one hour at room temperature and then for one hour at 85°. After cooling, 40 ml. of water was added slowly, and enough dilute hydrochloric acid to make a clear acid solution. This solution was then evaporated to dryness, and the residue chromatographed on an aluminum oxide column. The fraction with methanol-benzene (1:9) gave dl-7-chloro-2-(1-hydroxyethyl) - 3 - methyl - 4 - oxo - 1,2,3,4 - tetrahydro-6-quinazoline sulfonamide, M.P. 250–251.5°.

Example 11

A suspension of 5 g. of dl-8-chloro-3-methyl-7-sulfamyl-4,1-benzoxazepine-2,5(1H,3H)-dione in 500 ml. methanol was heated on a steam bath until solution resulted, and saturated with ammonia. After standing overnight, the solution was evaporated to dryness. The solid residue was chromatographed on aluminum oxide and the fraction taken with methanol-benzene (1:9) yielded 7 - chloro - 3,4 - dihydro - 2 - (1 - hydroxyethyl)-4-oxo-6-quinazoline sulfonamide which, upon recrystallization from methanol, melted at 242–244°. Ethyl acetate-benzene (1:9) fractions yielded 4-chloro-N-(2-hydroxypropionyl)-5-sulfamylanthranilic acid methyl ester which, upon being recrystallized from acetone-petroleum ether, melted at 263.5–265°. By treating this compound with methylamine in methanol solution, 7-chloro-3,4-dihydro-2-(1-hydroxyethyl) - 3 - methyl - 4 - oxo - 6-quinazoline sulfonamide was obtained. On the other hand, treatment of the same compound with ammonia yielded 7 - chloro - 3,4 - dihydro - 2 - (1 - hydroxyethyl)-4-oxo-6-quinazoline sulfonamide.

Example 12

To a solution of 14 g. of anthranilic acid and 9 ml. of pyridine in 2 liters of anhydrous ether, 12 g. of chloroacetyl chloride dissolved in 200 ml. of ether was added dropwise at 0°. After the addition was complete, the reaction mixture was stirred for 1 hour at room temperature. A saturated solution of hydrogen chloride in ether was then added to complete the precipitation of pyridine hydrochloride, which was filtered off, washed with ether and the latter evaporated. The crystalline residue was recrystallized from 50% acetic acid yielding N-chloroacetyl-anthranilic acid, M.P. 183–187°.

Example 13

To a solution of 17.2 g. of 5-chloroanthranilic acid and 8 ml. of pyridine in 2 liters of anhydrous ether, 11.5 g. of chloroacetyl chloride dissolved in 100 ml. ether was added dropwise at 0°. After the addition was complete, the reaction mixture was stirred for 1 hour at room temperature. A saturated solution of hydrogen chloride in ether was then added to complete the precipitation of pyridine hydrochloride, which was filtered off, washed with ether; and the latter evaporated. The crystalline residue was recrystallized from 50% acetic acid, yielding N-chloroacetyl-5-chloroanthranilic acid melting at 215–216.5°.

Example 14

A solution of 5 g. of N-chloroacetyl-anthranilic acid in 150 ml. of dimethylformamide was refluxed for 7 hours on an oil bath. After cooling, a large excess of water was added and a small precipitate was filtered off. The filtrate was evaporated to dryness; the residue crystallized from acetone, the crystalline part filtered off, and the mother liquor evaporated to dryness. The so-obtained residue was recrystallized from methylene chloride, giving 4,1-benzoxazepine-2,5(1H,3H)-dione, M.P. 200–201°.

Example 15

A solution of 4 g. of N-chloroacetyl-5-chloroanthranilic acid in 60 ml. of dimethylformamide was refluxed for ½ hour, cooled, and a large excess of water added thereto. The resulting precipitate was filtered off, dried and boiled in methylene chloride. The insoluble part was then filtered off and recrystallized from acetone, yielding 7-chloro-4,1-benzoxazepine-2,5(1H,3H)-dione melting at above 225°.

Example 16

A solution of 19.3 parts of N-bromoacetyl-anthranilic acid in 500 parts of dimethylformamide was refluxed for 4½ hours, and then evaporated to dryness. The residue was dissolved in methylene chloride, the so-formed solution shaken with water, then a 10% solution of sodium bicarbonate and finally water, dried over anhydrous sodium sulfate and evaporated to dryness. The residue was crystallized from methylene chloride, yielding 4,1-benzoxazepine-2,5(1H,3H)-dione melting at 200–201°.

Example 17

A hot solution of 5.5 parts of 4,1-benzoxazepine-2,5(1H,3H)-dione in 1000 parts of methanol was saturated with ammonia, and allowed to stand for several days at room temperature. After evaporation to a small volume, a crystalline precipitate formed, which was collected and crystallized from methanol, giving 2-hydroxymethyl-4-(3H)-quinazolinone, which decomposed slowly above 214°.

Example 18

A hot solution of 3 parts of 4,1-benzoxazepine-2,5(1H,3H)-dione in 300 ml. of methanol was saturated with methylamine and allowed to stand overnight. The solvent was evaporated; the residue dissolved in methylene chloride, the solution filtered and evaporated. The resulting residue was recrystallized from acetone, giving 2-hydroxymethyl-3-methyl-4(3H)-quinazolinone, M.P. 153–154°.

Example 19

To a solution of 17.1 parts of 5-chloroanthranilic acid in 200 parts of dimethylformamide at 0°, there was added 25.9 parts of α-bromopropionyl bromide, and the reaction mixture then stirred for 2 hours. The resultant solution was poured into an excess of cold water, the precipitate collected, washed with water and dried. Recrystallization from methylene chloride yielded N-(α-bromopropionyl) - 5 - chloroanthranilic acid, M.P. 193–194°. 15.3 parts of the latter compound was dissolved in 500 parts of dimethylformamide and refluxed for 2 hours. The dimethylformamide was then distilled off and the residue crystallized from methanol, yielding dl-7-chloro-3 - methyl - 4,1-benzoxazepine-2,5(1H,3H)-dione, M.P. 242–244°.

Example 20

A hot suspension of 2 parts of 7-chloro-3-methyl-4,1-benzoxazepine-2,5(1H,3H)-dione in 300 parts of methanol was saturated with methylamine and left for several days at room temperature. After evaporation to dryness, the crystalline residue was recrystallized from acetone yielding dl - 6-chloro-2(1-hydroxyethyl)-3-methyl-4(3H)-quinazolinone, which melted at 123–125.5°.

Example 21

A solution of 4 parts of N-(bromopropionyl)-anthranilic acid in 300 parts of dimethylformamide was refluxed for 3 hours and then evaporated. The residue was dissolved in methylene chloride, the so-formed solution shaken with water, then a 10% solution of sodium bicarbonate and finally water, dried over anhydrous sodium sulfate and evaporated to dryness. The residue was recrystallized from benzene-ether mixture, yielding dl-3-methy - 4,1 - benzoxazepine-2,5(1H,3H)-dione melting at 194–196.5°.

Example 22

A solution of 9 parts of dl-3-methyl-4,1-benzoxazepine-2,5(1H,3H)-dione in 1000 parts of methanol was saturated with anhydrous ammonia and left for one week at room temperature. It was then evaporated to dryness, and the residue recrystallized from acetone to give dl-2-(1-hydroxyethyl)-4(3H)-quinazolinone, M.P. 190–191°. This compound is choleretic.

Example 23

A solution of 8.5 parts of dl-3-methyl-4,1-benzoxazepine-2,5(1H,3H)-dione in 500 parts of methanol was saturated with methylamine and left overnight at room temperature. It was then evaporated to dryness and the residue recrystallized from acetone to yield N-(2-hydroxypropionyl)-anthranilic acid N-methylamide, M.P. 166–168°. Four parts of the latter compound were heated for one hour in vacuo at 180°. The resultant melt was crystallized from water and gave 2-(1-hydroxyethyl)-3-methyl-4(3H)-quinazolinone, M.P. 63.5–65.5°.

Example 24

A suspension of 8 parts of 7-chloro-4,1-benzoxazepine-2,5(1H,3H)-dione in 1000 parts of methanol was saturated with ammonia and left for 1 week at room temperature. It was then evaporated to dryness, and the residue crystallized from methanol to give 6-chloro-2-hydroxymethyl - 4(3H)-quinazolinone, M.P. 250° with decomposition.

Example 25

A suspension of 6 parts of 7-chloro-4,1-benzoxazepine-2,5(1H,3H)-dione in 1000 parts of methanol was saturated with methylamine, and left for 1 week at room temperature. It was then evaporated to dryness and the residue recrystallized from water to yield 6-chloro-2-hydroxymethyl - 3-methyl - 4(3H)-quinazolinone, M.P. 163–166°.

Example 26

A suspension of 8.5 parts of 7-chloro-3-methyl-4,1-benzoxazepine-2,5(1H,3H)-dione in 1000 parts of methanol was saturated with ammonia, and left 1 week at room temperature. It was then evaporated to dryness, and the residue crystallized from water to yield dl-6-chloro-2-(1-hydroxyethyl) - 4(3H)-quinazolinone, M.P. 215–215.5°.

Example 27

To the solution of 15.1 g. of N-methylanthranilic acid in 100 ml. of dimethylformamide at 0°, was added 13.4 g. of chloroacetyl chloride, and the reaction mixture stirred for 2 hours. A large excess of water was added and the resultant suspension extracted with methylene chloride. The extract was washed with water, dried over sodium sulfate and evaporated in vacuo. The residue was dissolved in 600 ml. of dimethylformamide and this solution refluxed for 4½ hours. The solution was evaporated in vacuo to dryness, and the residue dissolved in 500 ml. of methylene chloride. It was washed successively with water, 10% sodium bicarbonate and water, dried and evaporated. The solid residue was crystallized from methanol, giving 1-methyl - 4,1-benzoxazepine-2,5(1H,3H)-dione.

Example 28

A suspension of 16 g. of 1-methyl-4,1-benzoxazepine-2,5(1H,3H)-dione in 1000 ml. of methanol was saturated with ammonia at room temperature. The resultant solution was left to stand for 1 week. It was then evaporated in vacuo, and the solid residue recrystallized from methanol to give 2-hydroxymethyl-1-methyl-4(1H)-quinazolinone, M.P. 178–180°.

Example 29

To a solution of 9.2 g. of 5-chloro-N-methylanthranilic acid in 50 ml. of dimethylformamide at 0°, was added 6 g. of chloroacetyl chloride, and the reaction mixture stirred for 2 hours. A large excess of water was added and the resulting suspension extracted with methylene chloride. The extract was washed with water, dried and evaporated. The residue was dissolved in 150 ml. of dimethylformamide and refluxed for 2 hours, and then evaporated in vacuo. The residue was dissolved in methylene chloride. Thereafter, the solution was washed successively with water, 10% sodium bicarbonate solution and water. The resultant mixture was dried and evaporated. The solid residue was recrystallized from methanol to give 7-chloro-1-methyl-4,1-benzoxazepine-2,5(1H,3H)-dione, M.P. 147–149° This compound is a choleretic.

Example 30

The suspension of 11.3 g. of 7-chloro-1-methyl-4,1-benzoxazepine-2,5(1H,3H)-dione in 500 ml. of methanol was saturated with ammonia at room temperature, and the resultant solution left to stand for 1 week. The precipitate, which was formed at this time, was collected, boiled in methanol, and filtered. It gave 6-chloro-2-hydroxymethyl - 1-methyl - 4(1H)-quinazolinone which gradually melted above 205°.

Example 31

A stirred solution of 15.1 g. of N-methylanthranilic acid and 9.6 g. of pyridine in 1000 ml. of anhydrous ether was cooled to 0°, and a solution of 25.9 g. of α-bromopropionyl bromide was then added dropwise. The reaction mixture was stirred for an additional 2 hours, followed by the addition of the ether saturated with hydrogen chloride until precipitation no longer occurred. The pyridine hydrochloride was filtered and the filtrate evaporated to dryness. The noncrystalline residue, N-methyl-N-(α-bromopropionyl)anthranilic acid, was dissolved in 1000 ml. of dimethylformamide, refluxed for 4 hours and then evaporated. The residue was dissolved in methylene chloride. This solution was successively washed with water, 10% sodium bicarbonate and water, dried and evaporated. The crystalline residue was twice recrystallized from methanol to give dl-1,3-dimethyl - 4,1-benzoxazepine - 2,5(1H,3H)-dione, M.P. 143–144°.

Example 32

The suspension of 10.2 g. of 1,3-dimethyl-4,1-benzoxazepine-2,5(1H,3H)-dione in 500 ml. of methanol was saturated with ammonia at room temperature and the resulting solution left to stand for 1 week. It was then evaporated to dryness and the residue recrystallized from methanol to give dl-2-(1-hydroxyethyl)-1-methyl-4(1H)-quinazolinone, M.P. 155–157°.

Example 33

To the stirred solution of 7.4 g. of 5-chloro-N-methylanthranilic acid in 25 ml. of dimethylformamide at 0° was added 10.6 g. of bromopropionyl bromide and the resultant mixture was stirred for 3 hours. It was then poured into a large excess of water and extracted with methylene chloride. The extract was dried and evaporated. The noncrystalline residue, N-methyl - N-(α-bromopropionyl)-5-chloroanthranilic acid, was dissolved in 300 ml. of dimethylformamide and the soluton refluxed 2 hours. The solution was then evaporated. The residue was taken up in methylene chloride, and this solution washed successively with water, 10% sodium bicarbonate and water, dried and evaporated. Crystallization from methanol gave dl-7-chloro-1,3-dimethyl-4,1-benzoxazepine-2,5(1H,3H)-dione, M.P. 126–128°.

Example 34

The suspension of 12 g. of 7-chloro-1,3-dimethyl-4,1-benzoxazepine-2,5(1H,3H)-dione in 750 ml. of methanol was saturated with ammonia at room temperature. The resultant solution was left to stand for 1 week. It was then evaporated to dryness, and the residue recrystallized twice from water giving dl-6-chloro-2-(1-hydroxyethyl)-1-methyl-4(1H)-quinazolinone, M.P. 175.5–177.5°.

Example 35

To a solution of 27 g. of 4-chloro-N-methylanthranilic acid in 100 ml. of dimethylformamide at 0°, was added 19 g. of chloroacetyl chloride and the reaction mixture was stirred for 3 hours at room temperature. A large excess of water was added and the resulting suspension extracted with methylene chloride. The extract was washed with water, dried over sodium sulfate anhydrous and evaporated in vacuo. The solid residue was recrystallized from a mixture of methylene chloride and hexane to yield 4-chloro-N-chloroacetyl-N-methylanthranilic acid, M.P. 162–165°.

Example 36

A solution of 28 g. of 4-chloro-N-chloroacetyl-N-methylanthranilic acid in 1000 ml. of dimethylformamide was refluxed for 2 hours and then evaporated in vacuo. The residue was dissolved in methylene chloride and the solution was washed successively with water, 10% sodium bicarbonate solution and water. The solution was dried and evaporated. The residue was recrystallized from methanol to yield 8-chloro-1-methyl-4,1-benzoxazepine-2,5(1H,3H)-dione, M.P. 216–218°.

Example 37

A suspension of 10 g. of 8-chloro-1-methyl-4,1-benzoxazepine-2,5(1H,3H)-dione in 1000 ml. of methanol was saturated with ammonia and the resultant solution left to stand for 4 days. The solution was then evaporated, and the residue dissolved in methylene chloride. The addition of hexane precipitated 7-chloro-2-hydroxymethyl-1-methyl-4(1H)-quinazolinone, which melts above 225°.

Example 38

To a stirred solution of 21.3 g. of N-phenyl-anthranilic acid and 9.6 g. of pyridine in 1500 ml. of anhydrous ether at 0° was added dropwise 13.4 g. of chloroacetyl chloride. Stirring was continued for an additional 2 hours. The excess of pyridine was precipitated by the addition of an ethereal solution of gaseous hydrogen chloride. The pyridine hydrochloride was filtered off and the filtrate evaporated to dryness in vacuo. Recrystallization of the residue from ethanol gave N-chloroacetyl-N-phenylanthranilic acid, M.P. 183–184°.

Example 39

A solution of 17 g. of N-chloroacetyl-N-phenylanthranilic acid in 500 ml. of dimethylformamide was refluxed for 4 hours and then evaporated to dryness in vacuo. The residue was dissolved in methylene chloride. This solution was washed successively with water, 10% sodium bicarbonate solution and water. The solution was dried and evaporated. The residue was recrystallized from methanol to yield 1-phenyl-4,1-benzoxazepine-2,5(1H,3H)-dione, M.P. 136–138°.

Example 40

A suspension of 12.6 g. of 1-phenyl-4,1-benzoxazepine-2,5(1H,3H)-dione in 500 ml. of methanol was saturated with ammonia and the resultant solution left to stand for 3 days. The solution was then evaporated, and the crystallization of the residue from ethanol gave 2-hydroxymethyl-1-phenyl-4(1H)-quinazolinone, M.P. 203–208°.

Example 41

To a stirred solution of 42.6 g. of N-phenylanthranilic acid and 19.2 g. of pyridine in 3 liters of anhydrous ether at 0° was carefully added 51.8 g. of α-bromopropionylbromide. Stirring was continued for an additional 2 hours. The excess of pyridine was precipitated by the addition of an ethereal solution of gaseous hydrogen chloride. The pyridine salts were filtered off and the filtrate evaporated to dryness in vacuo. The resultant noncrystalline product, N - phenyl-N-(α-bromopropionyl)-anthranilic acid, was dissolved in 1000 ml. of dimethylformamide and the solution refluxed for 4 hours and then evaporated to dryness. The residue was dissolved in methylene chloride and the solution was washed with 10% sodium bicarbonate solution and water, dried and evaporated. The crystallization from methanol gave 3-methyl-1-phenyl-4,1-benzoxazepine-2,5(1H,3H)-dione, M.P. 186–187.5°.

Example 42

A suspension of 13.4 g. of 3-methyl-1-phenyl-4,1-benzoxazepine 2,5(1H,3H)-dione in 500 ml. of methanol was saturated with ammonia, and the resultant solution left to stand for 4 days. The solution was then evaporated to dryness and the residue recrystallized from water to give 2 - (1-hydroxyethyl)-1-phenyl-4(1H)-quinazolinone, M.P. 169–170°.

Example 43

The mixture of 7.6 g. of 8-chloro-3-methyl-7-sulfamyl-4,1-benzoxazepine-2,5(1H,3H)-dione and 2.4 g. of hydrazine in 500 ml. of methanol was refluxed overnight and then cooled. The resultant precipitate was collected and recrystallized from methanol to give 3-amino-7-chloro - 3,4-dihydro-2-(1-hydroxyethyl)-4-oxo-6-quinazolinesulfonamide, M.P. 255.5–256.5°.

Example 44

A mixture of 24 g. of 3-methyl-4,1-benzoxazepine-2,5-(1H,3H)-dione and 11.2 g. of hydrazine in 2 liters of methanol was refluxed for 24 hours and then left at room temperature for 2 days. It was then evaporated to dryness and the residue recrystallized from a methylene chloride-hexane mixture to give 3-amino-2-(1-hydroxyethyl)-4(3H)-quinazolinone, M.P. 108–110°.

We claim:
1. N - phenyl-N-(2-halo-lower alkanoyl)-5-halo-anthranilic acid.
2. N - phenyl-N-(2-halo-lower alkanoyl)-anthranilic acid.

References Cited by the Examiner
UNITED STATES PATENTS

| | | | |
|---|---|---|---|
| 2,910,488 | 10/1954 | Novello | 260—397.7 |
| 2,952,680 | 9/1960 | Novello | 260—256.5 |
| 3,072,656 | 1/1963 | Werner et al. | 260—397.7 |
| 3,100,226 | 8/1963 | Raman et al. | 260—518 |

FOREIGN PATENTS

| | | |
|---|---|---|
| 599,310 | 7/1961 | Belgium. |
| 106,502 | 8/1898 | Germany. |
| 5,598 | 6/1958 | Japan. |

OTHER REFERENCES

Beilstein's Handbuch der Organischen Chemie, 4th ed., vol. 14, pages 540 to 541, 548 to 549 and 584, Verlag Julius Springer, Berlin, Germany (1933).

Epstein et al.: J. American Chem. Soc., vol. 79, pages 5814–5817 (1957).

Jacobs et al.: J. Am. Chem. Soc., vol. 41, pp. 470 and 474 (1919).

Riedel: Chemisches Zentralblatt, vol. 83, page 1773 (1912).

Smith: Biochemical Journal, vol. 75, pages 284–293 (1960).

JOHN D. RANDOLPH, *Primary Examiner.*

NICHOLAS RIZZO, *Examiner.*

E. E. BERG, *Assistant Examiner.*